US012665494B2

(12) United States Patent
Bishnoi et al.

(10) Patent No.: US 12,665,494 B2
(45) Date of Patent: Jun. 23, 2026

(54) FLYING CAPACITOR CONVERTER AND METHOD FOR PROTECTING A FLYING CAPACITOR CONVERTER

(71) Applicant: ABB Schweiz AG, Baden (CH)

(72) Inventors: Hemant Bishnoi, Brugg (CH); Sami Pettersson, Dietikon (CH); Francisco Canales, Baden-Dättwil (CH)

(73) Assignee: ABB Schweiz AG, Baden (CH)

( * ) Notice: Subject to any disclaimer, the term of this patent is extended or adjusted under 35 U.S.C. 154(b) by 290 days.

(21) Appl. No.: 18/643,393

(22) Filed: Apr. 23, 2024

(65) Prior Publication Data

US 2024/0364211 A1 Oct. 31, 2024

(30) Foreign Application Priority Data

Apr. 26, 2023 (EP) .................................... 23169996

(51) Int. Cl.
| *H02M 1/32* | (2007.01) |
| *H02M 1/00* | (2006.01) |
| *H02M 3/07* | (2006.01) |

(52) U.S. Cl.
CPC ......... *H02M 1/325* (2021.05); *H02M 1/0009* (2021.05); *H02M 1/0095* (2021.05); *H02M 3/07* (2013.01)

(58) Field of Classification Search
CPC .. H02M 1/325; H02M 1/0009; H02M 1/0095; H02M 3/07
See application file for complete search history.

(56) References Cited

U.S. PATENT DOCUMENTS

| 12,334,812 B2* | 6/2025 | Bishnoi ................. H02M 1/322 |
| 2013/0343103 A1 | 12/2013 | Takizawa |

(Continued)

FOREIGN PATENT DOCUMENTS

| CN | 114301315 A | 4/2022 |
| EP | 3787166 A1 | 3/2021 |
| EP | 4007153 A1 | 6/2022 |

(Continued)

OTHER PUBLICATIONS

Amini et al., "A Fault-Diagnosis and Fault-Tolerant Control Scheme for Flying Capacitor Multilevel Inverters," *IEEE Transactions on Industrial Electronics*, 64(3): 1818-1826 (Mar. 2017).

(Continued)

*Primary Examiner* — Adolf D Berhane
(74) *Attorney, Agent, or Firm* — Fitch Even Tabin & Flannery LLP

(57) ABSTRACT

A flying capacitor converter comprising a protection circuit includes at least two cells, each having a capacitor having a first and second DC sides, a first switch connected to the first DC side and to a capacitor of a following cell or an output circuit, and a second switch connected to the second DC side and to the capacitor of the following cell or the output circuit. During a nominal non-fault operation of the flying capacitor converter, only one of the first and second switches is in a conducting state, and during a fault operation where the first switch has a short circuit failure and the second switch has a conducting state, the protection circuit is configured to keep the second switch switched-on.

15 Claims, 10 Drawing Sheets

(56) References Cited

U.S. PATENT DOCUMENTS

| | | | |
|---|---|---|---|
| 2021/0119442 A1 | 4/2021 | Pettersson et al. | |
| 2024/0364211 A1* | 10/2024 | Bishnoi | H02M 7/487 |

FOREIGN PATENT DOCUMENTS

| | | |
|---|---|---|
| EP | 4148964 A1 | 3/2023 |
| GB | 2564701 A | 1/2019 |
| JP | 2015-65781 A | 4/2015 |
| WO | WO 2015/025860 A1 | 2/2015 |

OTHER PUBLICATIONS

Chen et al., "Fault-tolerant Design for Flying Capacitor Multilevel Inverters," *2009 IEEE 6th International Power Electronics and Motion Control Conference (PEMC)*, 1460-1464 (May 17-20, 2009).

Kou et al., "A Unique Fault-Tolerant Design for Flying Capacitor Multilevel Inverter," *IEEE Transactions on Power Electronics*, 19(4): 979-987 (Jul. 12, 2004).

Tang et al., "Detection and Identification of Power Device Failures Using Discrete Fourier Transform for Fault-Tolerant Operation of Flying Capacitor Multilevel Converters," *IEEE Journal of Emerging and Selected Topics in Power Electronics*, 10(5): 5081-5091 (Oct. 2022).

Turpin et al., "Fault Management of Multicell Converters," *IEEE Transactions on Industrial Electronics*, 49(5): 988-997 (Oct. 2002).

Wang et al., "A Short-Circuit Fault-Tolerant Strategy for Three-Phase Four-Wire Flying Capacitor Three-Level Inverters," *2019 IEEE 10th International Symposium on Power Electronics for Distributed Generation Systems (PEDG)*, 781-786 (Jun. 3-6, 2019).

European Patent Office, Extended European Search Report in European Patent Application No. 23169996.8, 13 pp. (Oct. 10, 2023).

* cited by examiner

_800_

_802_ operating the flying capacitor converter

_804_ non-fault operation: controlling a current, by the control circuit, by switching the first and the second switches, and switching the second switch on only when the first switch is switched-off

_806_ detecting a fault operation

_808_ keeping, by a protection circuit, the second switch switched-on once it is switched on

FLYING CAPACITOR CONVERTER AND METHOD FOR PROTECTING A FLYING CAPACITOR CONVERTER

CROSS-REFERENCE TO RELATED APPLICATIONS

The instant application claims priority to European Patent Application No. 23169996.8, filed Apr. 26, 2023, which is incorporated herein in its entirety by reference.

FIELD OF THE DISCLOSURE

The present disclosure relates to a flying capacitor converter and to a method for protecting a flying capacitor converter.

BACKGROUND OF THE INVENTION

Flying capacitor multilevel topology, including the ANPC-flying capacitor hybrid topology with low-voltage MOSFETs, IGBTs etc. can bring a significant converter weight reduction with a competitive cost. One specific failure that may occur in such converters is the failure of active switches (MOSFETs, IGBTs etc.) in short-circuit state. The switches could fail themselves, where MOSFETs are typically known to be prone to failure in short-circuit mode, or it is possible that the gate-drive has failed in the gate-on state and no longer responds to the gate drive signal input from the modulator. In any case, the flying capacitor cell in which the failed switch resides needs to be detected and corrective action has to be taken.

BRIEF SUMMARY OF THE INVENTION

There may be a desire to provide an improved converter. The described embodiments pertain to the flying capacitor converter and a method for protecting a flying capacitor converter. Synergetic effects may arise from different combinations of the embodiments although they might not be described in detail.

Further on, it shall be noted that all embodiments of the present invention concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a flying capacitor converter comprising a protection circuit for protecting the flying capacitor converter from a short-circuit failure of a switch is provided. The flying capacitor converter comprises at least two cells. Each cell comprises a capacitor having a first DC side and a second DC side, a first switch connected to the first DC side and to a capacitor of a following cell or an output circuit, and a second switch connected to the second DC side and to the capacitor of the following cell or the output circuit. During a nominal non-fault operation of the flying capacitor converter, only one of the first switch and the second switch is in a conducting state, and during a fault operation where the first switch has a short-circuit failure, the protection circuit is configured to keep the second switch switched-on once the second switch is switched on.

BRIEF DESCRIPTION OF THE SEVERAL VIEWS OF THE DRAWING(S)

DETAILED DESCRIPTION OF THE INVENTION

Figure 1:
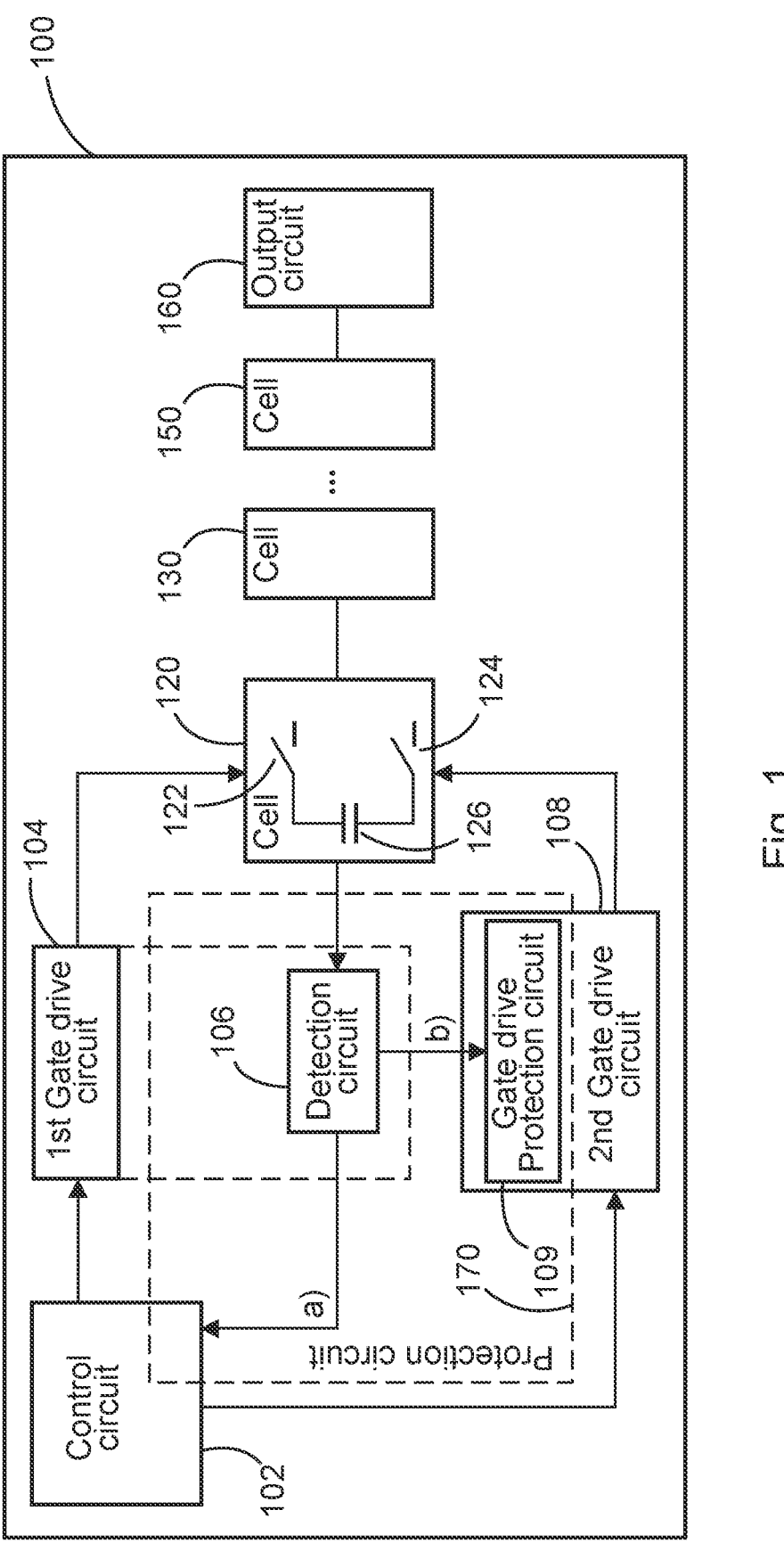
FIG. 1 is a block diagram of a flying capacitor converter in accordance with the disclosure.
Figure 2:
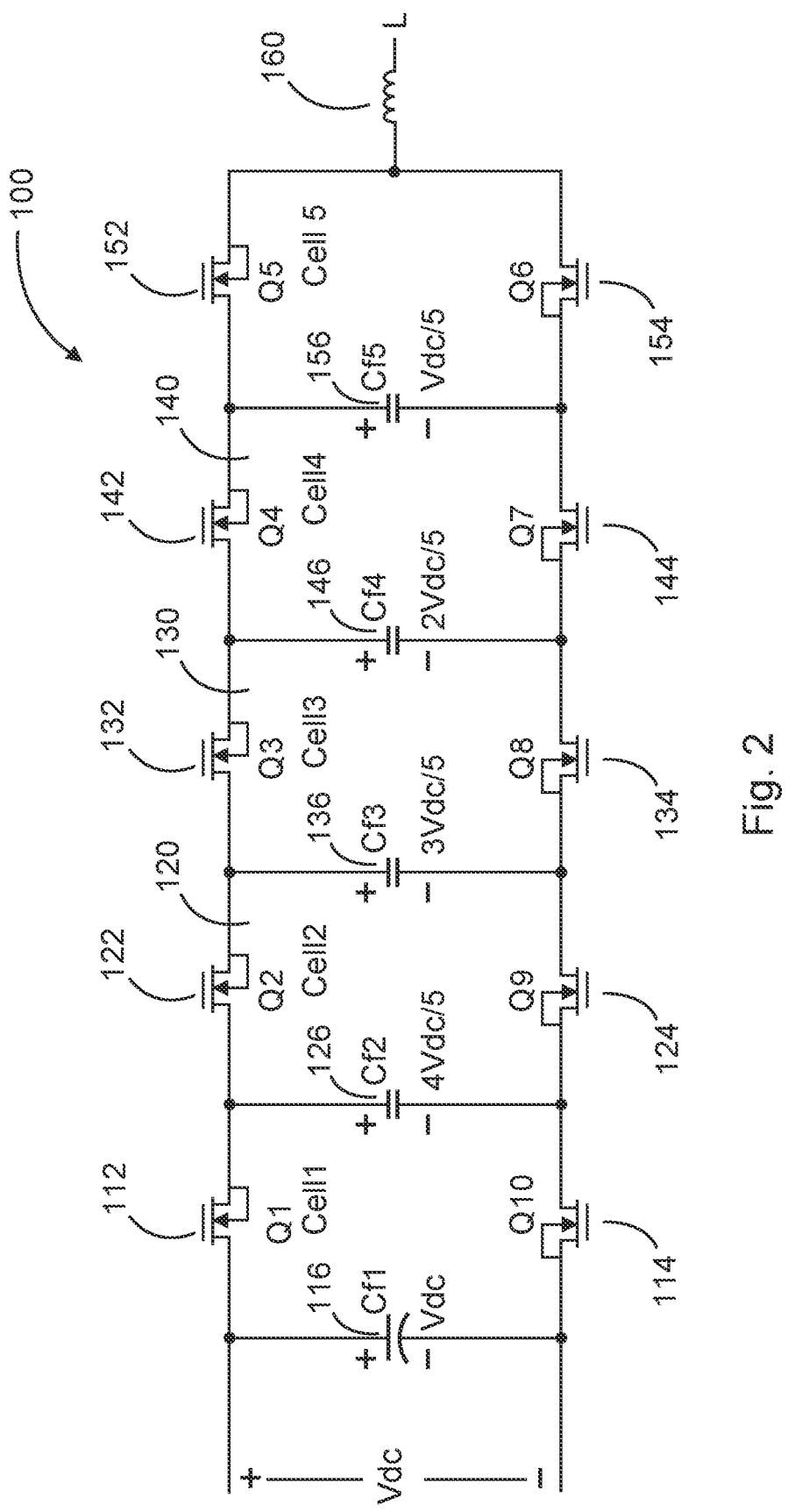
FIG. 2 is a diagram of a typical 6-level flying capacitor converter phase-leg in accordance with the disclosure.

Corresponding parts are provided with the same reference symbols in all figures. FIG. 1 shows a block diagram of a flying capacitor converter 100 comprising several cells depicted as blocks 120, 130 and 150, and an output circuit 160. The invention is explained by means of the cell "cell2" 120, which may be a second cell in the series of cells 110, 120, 130, 140, 150 of the six-level converter as shown in FIG. 2. In FIG. 1 only cells 120, 130, 150 are depicted for reasons of clarity. Cell 120 comprises a first switch 112, a second switch 114 and a capacitor 116. The block diagram covers the case that the first switch 112 is faulty, and the second switch 114 is controlled in response to the detection of the fault. However, the actual structure is preferably symmetrical and extends to all cells 120, 130 and 150, so that any of the switches 112, 114 and the corresponding switches in all further cells 130, 150 can be monitored and controlled in case of faults. Moreover, in all figures, only one phase leg is drawn. The flying cell converter 100 may comprise more than one phase leg, for example three phase legs, all constructed in the same manner as the one shown in the figures.

The block diagram shows further a control circuit 102, which controls the switches of the cells 120, 130 and 150 to obtain the respective desired voltages at the cells and currents between the cells, and the output circuit 160. The converter comprises further for each of the switches of the cells, e.g. switches 112 and 114 a gate drive circuit 104, 108. The gate drive circuits 104, 108 receive the control signal from the control circuit 102 and generate a gate signal for switching the switches 112, 114 off or on.

The components described so far are usual components of a flying cell converter. In addition to these, the flying converter 100 comprises a protection circuit 170. The protection circuit 170 comprises a detection circuit 106. The detection circuit 106 may be an independent circuit or may be a part of the first gate drive circuit 104 as illustrated by the dashed line. Two options are shown for handling the detection signal, i.e. the output of the detection circuit 106 in case of a fault.

In option a), the detection signal from the detection circuit 106 is input to the control circuit 102. The control circuit 102 processes the signal and, in case of a fault, generates a signal, which is also referred to as protection signal in this disclosure, which is led to the second gate driver 108. The second gate driver 108 then generates a gate drive signal that turns the second switch 114 on and keeps the second switch 114 switched on. In this case, the second gate drive circuit 108 does not have to be modified for protecting the cell, i.e., the second gate drive circuit 108 does not contain the gate drive protection circuit 109.

In Option b), the detection signal from the detection circuit 106 is input to the second gate drive circuit 108. In this case, the detection signal is processed by the second gate drive circuit 108. That is, the second gate drive circuit 108 requires an input for this signal and might need some logic and/or other circuitry by which a drive signal is generated based on the detection signal. This part of the second gate drive circuit 108 is here attributed to the protection circuit 170 and is called the gate drive protection circuit 109. The gate drive protection circuit 109 generates the protection signal based on the detection signal and provides it internally to the further second gate drive circuitry that finally generates the gate drive signal for the gate of the second switch. 114.

FIG. 2 shows as an example a diagram of a phase-leg of a typical 6-level flying capacitor converter 100. The invention is not restricted by the number of flying capacitor cells. Further, the converter 100 may comprise one or more phase legs. The leg phase in FIG. 2 has five flying capacitor cells: Cell1 110, Cell2 120, Cell3 130, Cell4 140, and Cell5 150, consisting of 10 switches Q1-Q10 112, 122, 132, 142, 152 and 114, 124, 134, 144, 154, five capacitors 116, 126, 136, 146, 156, and an output circuit 160. The switches Q1 . . . Q10 are shown as MOSFETs but also IGBTs or any other type of switches, in particular power semiconductors, may be used. Generalized, the flying capacitor voltages under nominal operation could be calculated as:

$$V_{Cfi} = \frac{(N - i + 1)V_{dc}}{N}$$

where 'i' is the cell number and N is the total number of cells, which is in this example five. Each cell (Cell1 . . . Cell5) has at least two switches (Q1, Q10; Q2, Q9; Q3, Q8; Q4, Q7; Q5, Q6), one on the top-side and one on bottom-side, where the index of the switch is related to cell number as:

$$Q_x = i$$

$$Q_y = 2N - i + 1$$

where 'x' is the switch index of top side cell and 'y' is the switch index for the bottom side switch for cell number 'i'. The terms "top side" and "bottom side" relates to the diagram in FIG. 2, where top is at the positive terminal of a capacitor or at an electrical positive line and bottom is at the negative terminal of a capacitor or at an electrical negative line.

Now, there can be many combinations or states of these switches, assuming they can be either switched-'on' or switched-'off'. However, one particular state is never allowed. This state is both Qx and Qy being 'on' at the same time. This is a forbidden state since it would short-circuit the capacitors on either side of the cell. Say, for example, in Cell3 130, if Q3 132 and Q8 134 are both 'on', then Cf3 136 and Cf4 146 will be short-circuit, with the resistance of only the switches Q3 132, Q8 134 and the connections to impede the massive current that would result from one capacitor getting discharging into the other. This discharging continues until both capacitors Cf3 136 and Cf4 146 have their voltages equalized, typically to a value that is average of their initial voltages (VCfi+VCf i+½). Therefore, these switches, e.g., Cf3 136 and Cf4 146, always are complimentary to each other, i.e., if one switch is 'off', then the other switch must be 'on'. The switching sequence is based on a modulation signal of a modulator defining on and off periods where the 'on'-duration DTsw is followed by an 'off'-duration (1−D)Tsw, where D is the duty-cycle (<=1) of the modulator's output signal and Tsw=1/fsw is the switching period. If both are 'off' then the connection to the phase terminal (L) will drop and the phase current will fall to zero, typically something that is not desired during normal operation but possible and is not catastrophic. In a typical nested loop control where the phase-currents are measured, dropping of the phase current would trip the converter 100.

Figure 3:
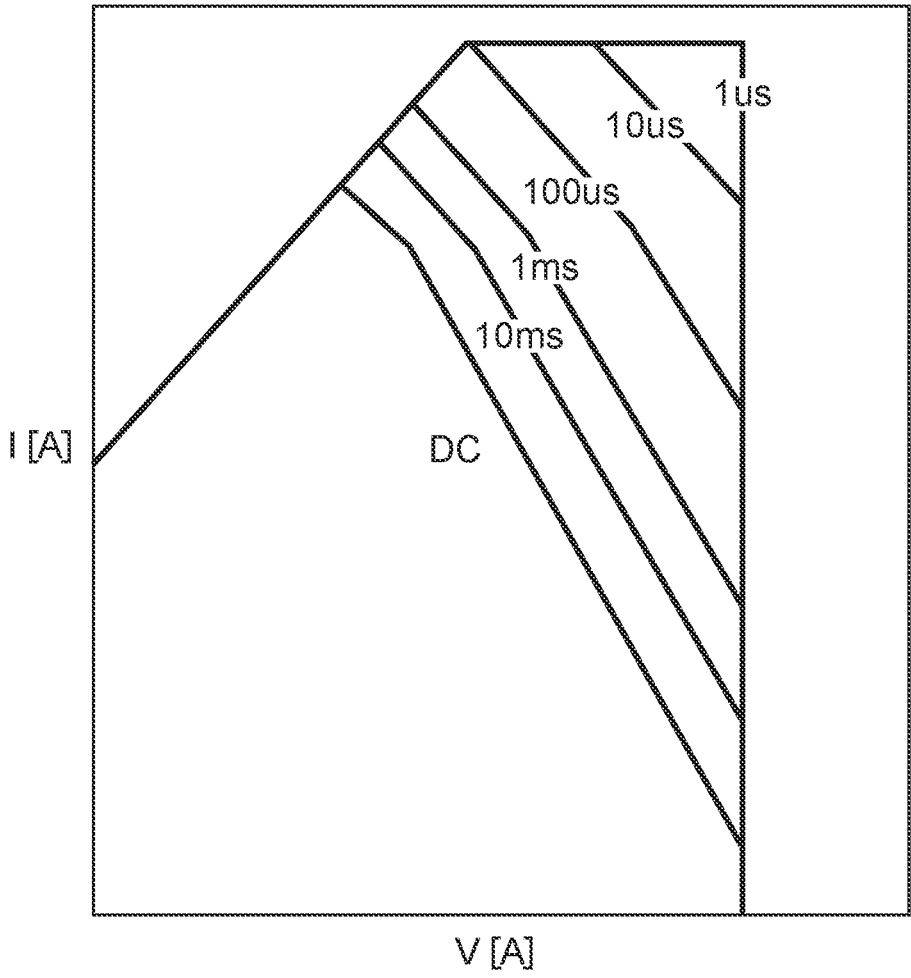
FIG. 3 is a plot of a safe operating area (SOA) in accordance with the disclosure.

These switches Q1 . . . Q10, typically have a safe operating area or SOA, which bounds the voltage, current and pulse duration combinations for which the manufacturer guarantees that the switch will withstand without failure. The SOAs may be plotted in a diagram such as the one shown in FIG. 3 and may be found in the data sheet of the manufacturer. The plot in FIG. 3 shows how much voltage after 'turn-off' and current before 'turn-off', the switch can withstand for a single pulse (single 'on' and 'off' event), where the pulse duration is mentioned on the plot. The measurements may be temperature dependent. Usually, the plots show measurements at a case temperature of 25° C.

Now imagine a situation where during the DTsw-portion of the switching period Q3 has a short circuit or its gate drive fails, where the gate voltage is always high (above the threshold voltage of the switch). If no corrective action is taken, then during the (1−D)Tsw portion of the time-period, the modulator will 'turn-on' switch Q8 134, and since the Q3 132 is not responding anymore to the modulator, the converter will enter the forbidden state, in fact repeatedly as the modulator keeps switching with a frequency of fsw and this could throw the switches Q3 132, Q8 134 in Cell3 130 outside their SOA and destroy them. Note that, the longer the pulse duration, the smaller is the SOA. Not to say that multiple pulses will destroy the switch, it may not, as the capacitor voltage equalization process is nearing completion, the current in the cell will fall. Thus, if the designers are sure that the switches will survive, they can allow more pulse before taking a corrective measure, and even allow the cell to continuously operate without any corrective measure. However, this disclosure addresses a design, where the switches may not survive such a condition and hence a corrective action is needed.

To make sure that the switches Q1 . . . Q10 never exit their SOA, once a short-circuit failure of a switch (say the topside switch Q3 132) is detected, the opposite (bottom) side switch Q8 134 in the faulted Cell3 130 should not be allowed to 'turn-off' once its 'turned-on'. This will ensure that the switch Q8 134 never exits its SOA. Now even if the delay in the detection of the short-circuit fault and the corrective action takes longer and the switch Q8 134 does 'turn-off', the corrective action should be still applied to at least ensure that the next time Q8 134 is turned-on, it does not get 'turned-off'. This is to lower the probability of switches getting destroyed due to excessive losses during the switching event.

Figure 4A:
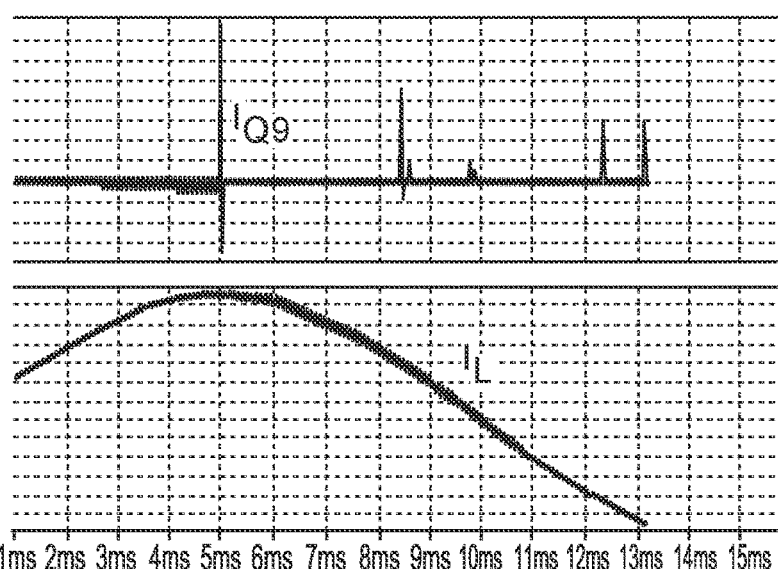
FIG. 4a illustrates diagrams of current waveforms when a switch is still working in accordance with the disclosure.
Figure 4B:
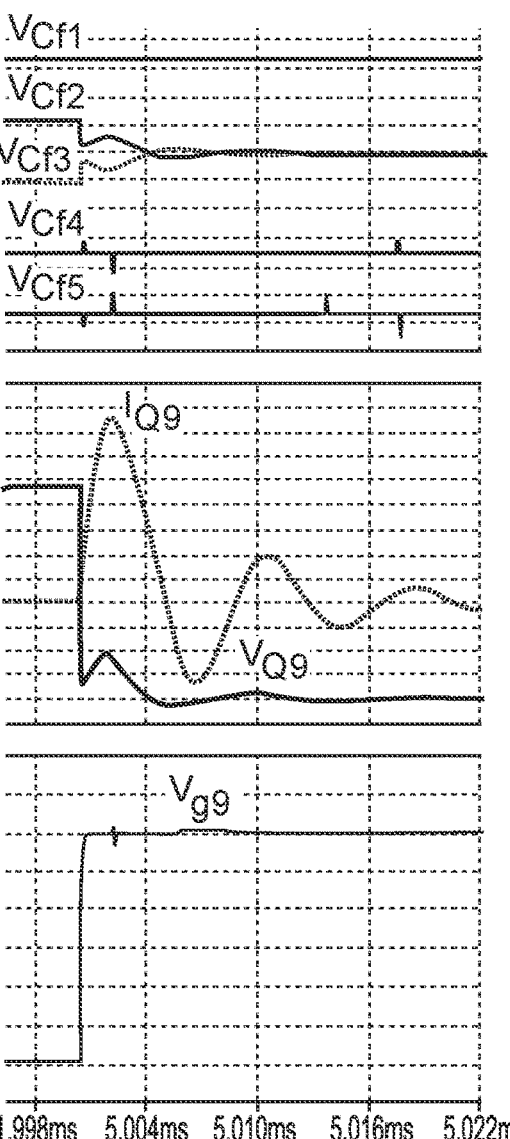
FIG. 4b illustrates diagrams of waveforms of flying capacitor currents and voltages across switch when the switch is still working at the fault instance in accordance with the disclosure.

We now show the effects in a detailed simulation of a single-phase inverter in SPICE circuit simulator. Here, we use the same five flying capacitor cells-based phase-leg 100 as shown in FIG. 2. In this simulation, we short-circuit the switch Q2 122 at 5 msec. This is because the invention can be applied to all, few, or any number of cells. The waveforms in FIG. 4a show that there is a huge spike in the current in the bottom-side switch Q9 124 of Cell2 120 when it turns-on. FIG. 4b shows the instant when the short-circuit fault happens in Q2 122. We can clearly see that the two flying capacitors Cf2 126 and Cf3 136 that bound the Cell2 120, equalize in the voltage. As per the invention described above, the signal to 'turn-on', the gate voltage Vg9 at switch Q9 124 is constantly held high once the short circuit is detected. The modulation signals to the other switches continue as usual and we can see that the load current IL is continuous, which means that the power is not interrupted. The following FIGS. 5a to 7b show embodiments, how this could be implemented.

Figure 5A:
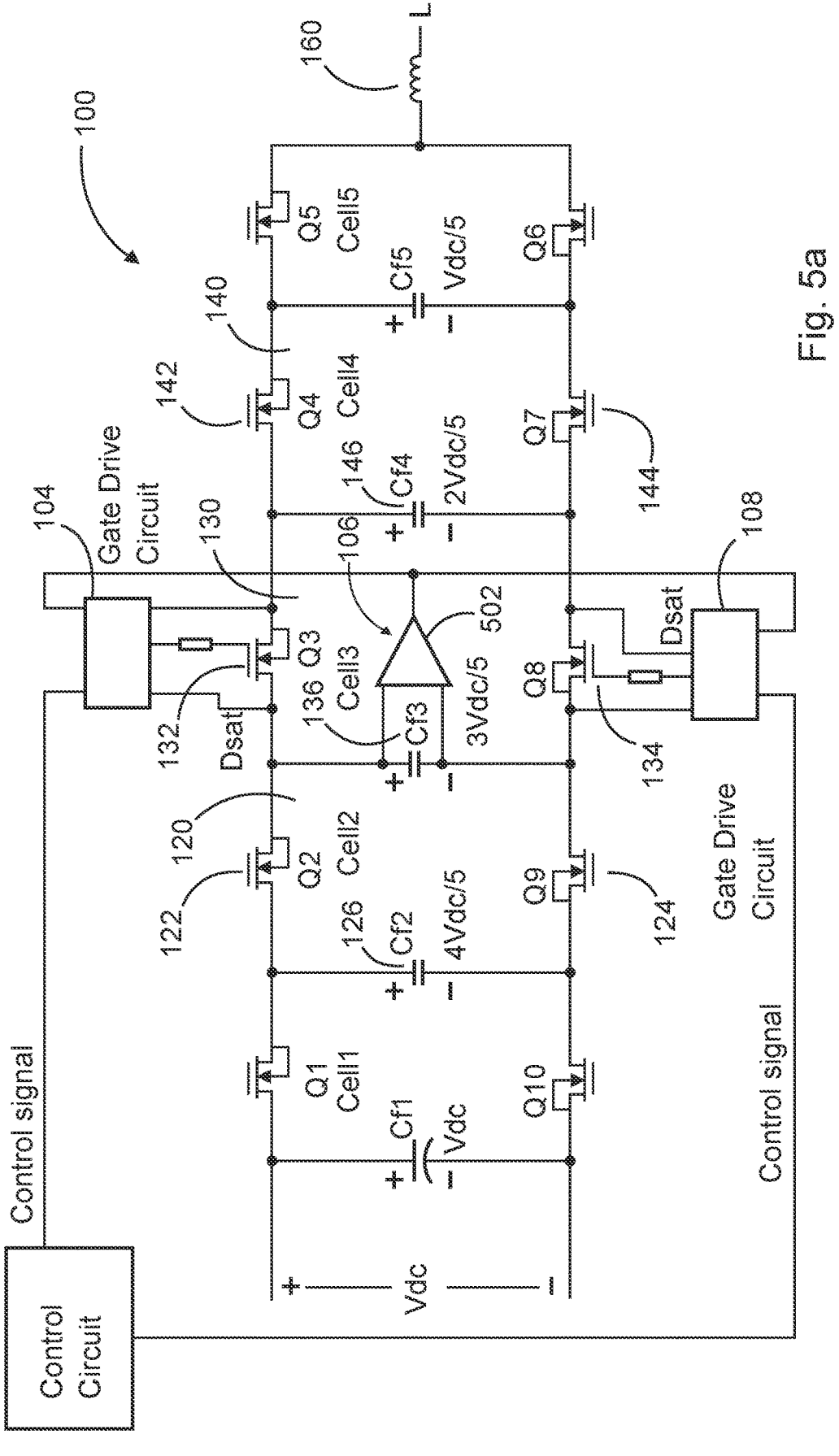
FIG. 5a is a first diagram of a flying capacitor converter according to an embodiment with direct-feedback of fault detection signal in accordance with the disclosure.
Figure 5B:
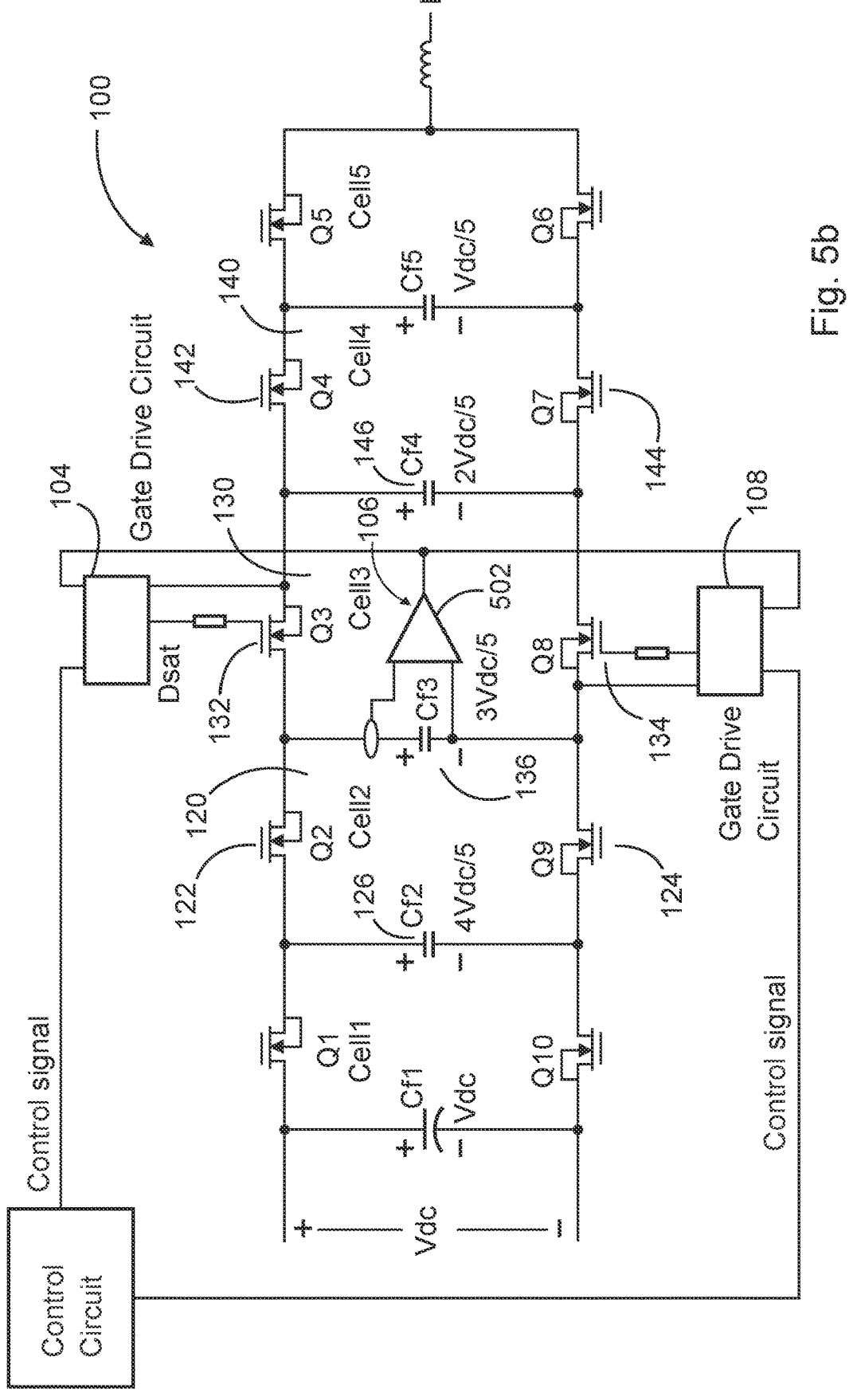
FIG. 5b is a first diagram of a flying capacitor converter according to an embodiment with direct-feedback of fault detection signal in accordance with the disclosure.

FIGS. 5a and 5b show an embodiment with a direct-feedback of a fault detection signal. The fastest way to ensure that the switch Q8 134 does not 'turn-off' after Q3 132 has failed in short-circuit is to have direct feedback of the fault detection signal to the drive-circuit of the switches Q3 132, Q8 134. In FIG. 5a, the flying capacitor voltage method is used to detect fault, where in case the voltage of the flying capacitor changes beyond a set threshold, the fault detection signal is generated using an operational amplifier 502, which may or may not be isolated. In addition, the gate-drive circuits 104, 108, may or may not consist of a gate-drive IC and may or may not be isolated. In FIG. 5b, the flying capacitor current method is used to detect fault. This fault detection signal is then routed to the corresponding gate drives circuits 104, 108 to take the necessary action of locking the still working switch into permanently 'on' position. The method of generating fault can be anything, but the action is always the same.

Figure 6:
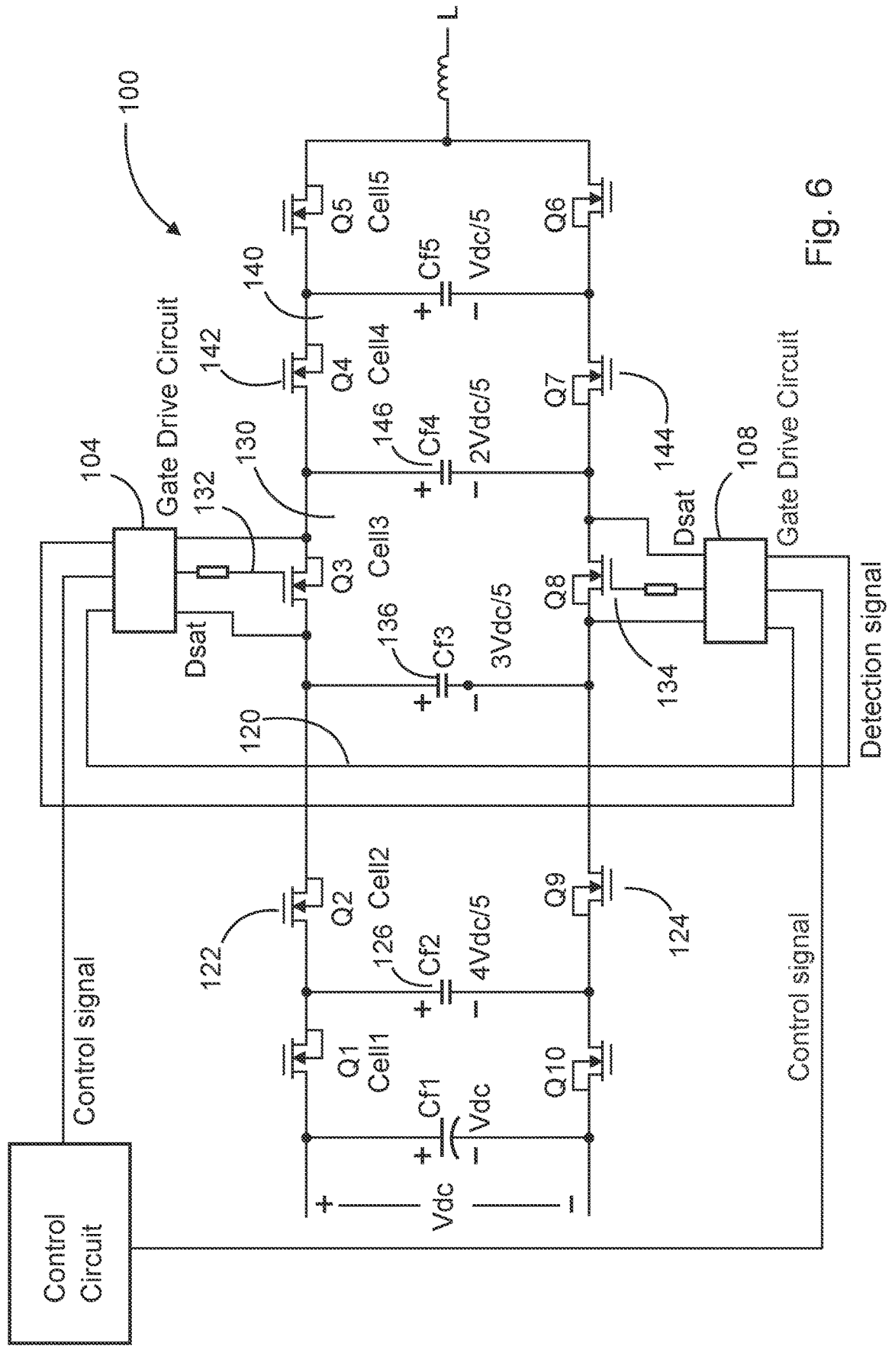
FIG. 6 is a diagram of a flying capacitor converter according to an embodiment with direct feedback from gate-drive circuit in accordance with the disclosure.

FIG. 6 shows an embodiment with a direct feedback from gate-drive circuit 104 or 108, respectively. This method is as the direct feedback of the fault detection signal, except the signal may be generated using the gate-drive circuit 104, 108 itself. One such signal is for example the Dsat detection signal, which could be also be integrated in the gate-drive ICs, as is in case of many commercially available ICs. This Dsat signal may be then used as feedback to lock the still working switch, e.g., Q8 134 in the flying capacitor cell 130, to a permanent on state. FIG. 6 shows this idea. Again, the gate-drive circuits 104, 108, may or may not consist of a gate-drive IC and may or may not be isolated. It is also possible to have the gate-drive 104 (108), switch 132 (134) and the detection circuit 106 build inside the same IC package.

Figure 7A:
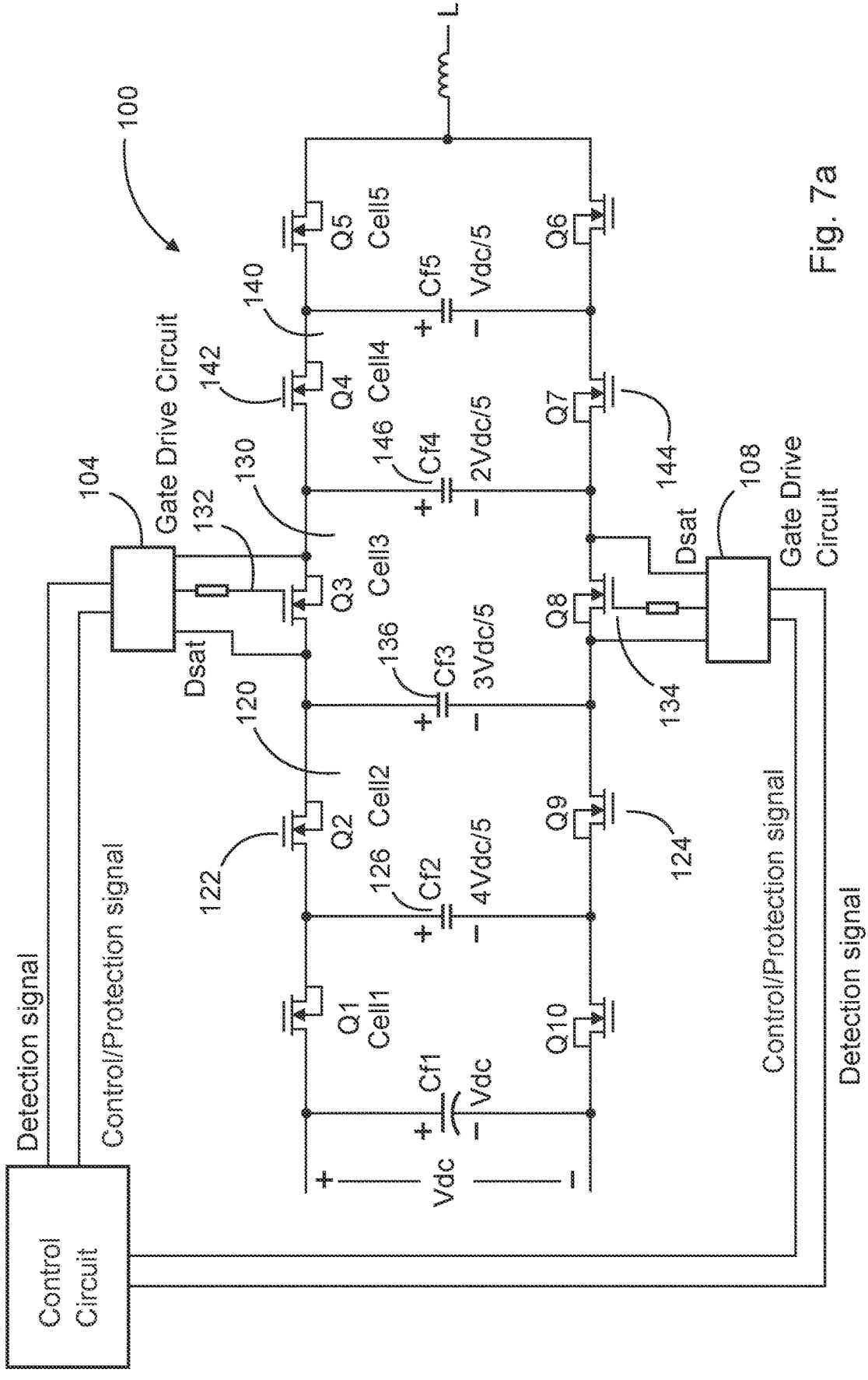
FIG. 7a is a first diagram of a flying capacitor converter according to an embodiment with indirect feedback of fault detection signal in accordance with the disclosure.
Figure 7B:
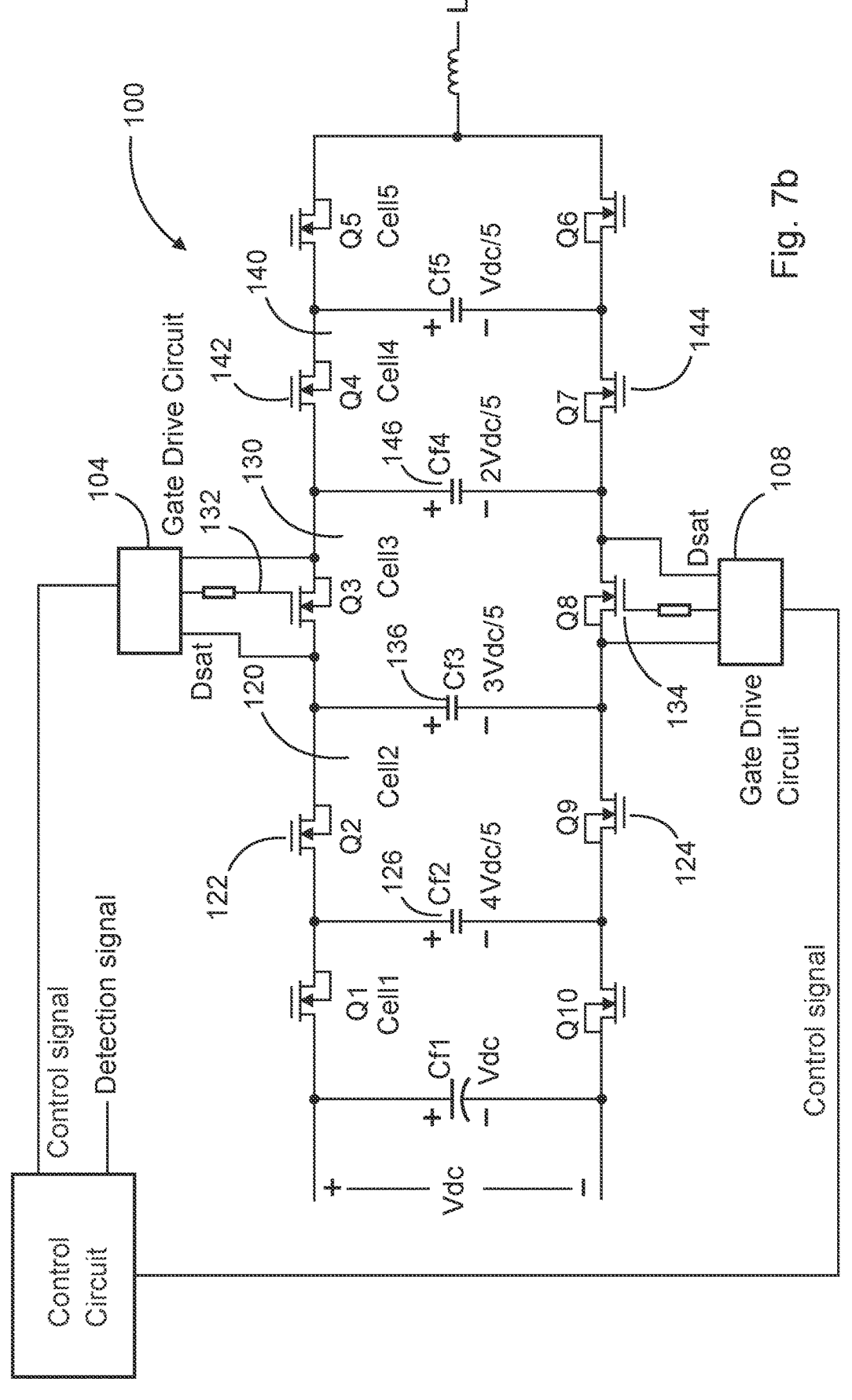
FIG. 7b is a second diagram of a flying capacitor converter according to an embodiment with indirect feedback of fault detection signal in accordance with the disclosure.

FIGS. 7a and 7b show an embodiment with an indirect feedback of the fault detection signal. One way of activating the protection signal is to go via the control circuit 102, whether central or local. Two such implementations are shown in FIGS. 7a and 7b. In FIG. 7a, the detection signal is generated by the gate-drive circuit 104, 108, which could be just the Dsat signal, which is routed to the control circuit 102. The control circuit 102 can be a DSP or an FPGA or just a digital or an analog circuit or any combination of those, which recognizes the fault detection signal and generates a protection signal for the gate-drive circuit of the still working opposite side switch, e.g., gate-drive circuit 108 and switch Q8 134 if Q3 132 is faulty, or vice versa, to remain 'on' permanently. In FIG. 7b, the fault detection signal is generated by other means, such as one of the means such as a phase voltage analyzer configured to detect a short circuit using a DFT or a flycap current and direction detection circuit using a Rogowski coil. The action of the control circuit 102 is the same as that described in the previous example of FIG. 7a.

Some other measures can also be taken once the protection is activated. As seen in FIG. 4b, once the short-circuit fault happens, the voltage difference between consecutive flying capacitors is no longer the same, meaning VCf1−VCf2≠VCf4−VCf5. This is a problem since this would mean unequal sharing of the de-bus voltage Vdc amongst the remaining operational switches. In the simulated case described above, this would mean that switches Q1 112, Q10 114, Q3 132 and Q8 134 will now block more voltage than other switches in the off state. Thus, we must take some measures to prevent over-voltage on the switches, which could destroy them. There are essentially two ways to do that:

The first way is to use switches with high enough rated voltage such that there is enough margin in case one cell fails in short-circuit.

The second way is to start with N+1 cells when N cells are already enough to handle the voltage. If once flying capacitor cell gets taken out of operation, then the number of remaining cells are still enough to ensure that there is no overvoltage on the switches. Since now one complete flying capacitor cell is taken out of operation, the converter 100 will work with reduced number of cells. Thus, when the fault is detected, the PWM carriers may be adjusted from N+1 cell scheme to an N cell scheme. This could for e.g. be an adjustment of the phase-shift between the carriers from 360°/(N+1) to 360°/(N). This would re-distribute the voltage on the flying capacitors, but it may take a few line cycles for it to settle down. This re-distribution will ensure that the voltage difference between and two consecutive flying capacitor is again equal, leading to an equal voltage sharing between the remaining operational switches.

Figure 8:
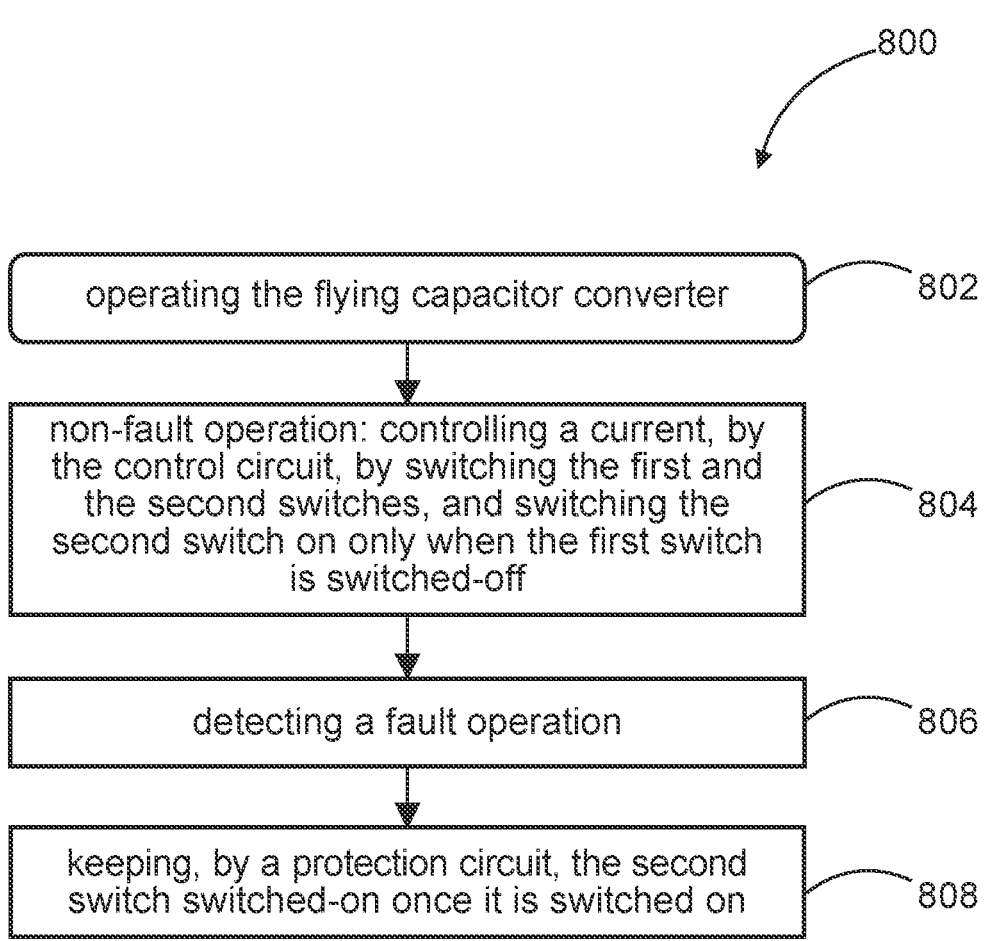
FIG. 8 is a flowchart of a method for protecting a flying capacitor converter.

FIG. 8 shows a flow diagram of the method for protecting a flying capacitor converter, wherein the flying capacitor converter comprises a control circuit; and a protection circuit for protecting the flying capacitor converter from a short-circuit failure of a switch comprising, wherein the flying capacitor converter comprises at least two cells, wherein each cell comprises a capacitor having a first DC side and a second DC side, a first switch connected to the first DC side and to a capacitor of a following cell or an output circuit; and a second switch connected to the second DC side and to the capacitor of the following cell or the output circuit, comprising the steps: operating 802 the flying capacitor converter; and during a non-fault operation, controlling 804 a current, by the control circuit 102, by switching the first and the second switches, and switching the second switch on only when the first switch is switched-off; or upon a detection 806 of a fault operation, where the first switch has a short-circuit failure and has a conducting state after a switching-off operation by the control circuit, and keeping 808, by the protection circuit, the second switch switched-on once it is switched on, e.g., by the control circuit or by the protection circuit. That is, the second switch remains in a conductive state.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

The protection circuit may switch on the second switch itself, or the second switch may be switched on by a control circuit, for example.

The flying capacitor converter is described herein as a flying capacitor converter with one phase leg. I.e., the cells are the cells of one such phase leg. However, the flying capacitor converter may comprise more than one phase legs, each of which may be constructed and operated as the one of the converter described herein.

A flying capacitor converter typically comprises a plurality of cascaded cells. A flying capacitor is connected by switches to a following stage or "level", i.e., to the flying capacitor of that following stage. Of course, a cell may comprise further devices such as diodes, resistors, switches, etc. to filter a voltage and/or current or to protect the capacitor or switches, which have to carry a high current or which have to withstand a high voltage, etc. Therefore, the flying capacitor and the switches are to be seen as the basic elements of a cell of the flying capacitor converter.

The switches of a cell are controlled such that only one of them is in an "on"-state at the same time. That is, the switches may be switched on, e.g., alternatingly, with or without gaps in between.

A switch may be a semiconductor switch such as an MOSFET, IGBT, etc. The drain junction of the semiconductor representing the first switch of the cell may be connected, for example, to the DC+ voltage at the positive capacitor side of the cell capacitor. Its source junction may be connected to the capacitor and the drain junction of a first semiconductor switch of the cell of the following stage. Correspondingly, the drain junction of the complementary semiconductor may be connected, for example, to the source junction of the cell of the following stage, and the source junction of this semiconductor to the DC-voltage at the negative capacitor side of the cell capacitor. The semiconductor switches of the last cell may be connected to an output circuit, for example, and may have a common connection to provide current to the output circuit. The semiconductors are switched such that voltage at the cell capacitor is higher than the voltage at the cell capacitor of the following stage. The voltage difference is, for example, 1/N VDC, where VDC is the input voltage at the cell capacitor and N is the number of cells. This describes the nominal case, where no fault such as a short circuit of a semiconductor of a cell is present. The reason of "short-circuit" may be, for example a defect of the semiconductor itself or a gate signal, e.g. generated by a defect gate drive, keeping the semiconductor in a permanent "on"-state. Therefore, "short-circuit" of a switch may be a defined as a state of the switch, where it is in a permanent, undesired "on"-state.

When the first switch is in a faulty state, in particular a short-circuit state, the protection circuit is configured to keep the second switch conductive once it is switched on. The second switch may be switched on, for example, in accordance with the nominal operation of the flying capacitor converter or by the protection circuit, for example, as soon as the short circuit is detected, or shortly after the detection. By this measure, there will flow a high current that equals the load and the voltage between the affected cell and the following cell. However, this will occur only once. A repeated high current flow is avoided and therefore, the converter is protected from further damage or even destruction.

According to an embodiment, the flying capacitor converter further comprises a control circuit. During the non-fault operation, the control circuit is configured to control a current by switching the first and the second switches, wherein the control circuit is further configured to switch the second switch on only when the first switch is switched-off. During the fault operation, where the first switch has a short-circuit failure and has a conducting state also after a switching-off operation by the control circuit, the control circuit is configured to switch on the second switch.

The control circuit does not necessarily know that the first switch is in a short-circuit condition. Therefore, it may operate nominally, which means that it switches on the second switch as if the first switch would be in a non-short-circuit condition. In embodiments, the control circuit has knowledge of the short-circuit condition of the first switch. In this case, the control circuit may also switch on the second switch or keep it switched on. In this disclosure, the signal provided by the control circuit for switching the switches nominally is referred to as control signal. The signal to switch on the second switch or keep it switched on due to fault condition is referred to as protection signal. The term "protection signal" is used generally to indicate a signal generated to protect the second switch.

Alternatively, the second switch is switched on when a short circuit is detected, independent on the nominal switching by the control circuit.

In any case, the fault does not cause the control circuit not to switch on the second switch.

According to an embodiment, the protection circuit comprises a detection circuit for detecting the short circuit, wherein the detection circuit is configured to detect the short-circuit by detecting a voltage or a current at the capacitor and/or first switch and to generate a detection signal to be used for keeping the second switch switched-on.

A short circuit at the first switch effects a current, e.g., from the capacitor of the cell to the capacitor of the following cell. The sign of the current depends on whether the first switch is the switch of the positive side of the converter or the negative side. The affected current is higher than the current, which would be nominally switched, and is therefore detectable as short circuit current. The current again affects a change in voltage at the capacitor of the cell, which results, for example in an average value of the nominal value at the capacitor of the cell and the nominal value at the capacitor of the following cell. The current or the voltage may be detected, for example by an operation amplifier that generates a detection signal, which again is used to keep the second switch switched on. There are several possibilities, how the signal can be used to keep the second switch conducting, once it is switched on. In various embodiments, the signal is input, for example, to a gate drive circuit connected to the second switch or to the control circuit for generating the protection signal.

According to an embodiment, the protection circuit further comprises a gate drive protection circuit configured to receive the detection signal and to provide the protection signal. That is, according to this embodiment, the gate drive protection circuit is a part of the protection circuit. The gate drive protection circuit generates the protection signal, which serves for generating the gate drive signal for switching the second switch on or keeping it switched-on.

According to an embodiment, the flying capacitor converter further comprises a first gate drive circuit connected to the control circuit for receiving a first control signal and for providing a drive signal to the first switch in accordance with the first control signal, and a second gate drive circuit connected to the control circuit for receiving a second control signal and for providing a drive signal to the second switch in accordance with the second control signal. The second gate drive circuit is configured to receive the detection signal or a protection signal based on the detection signal and to provide a gate driving signal for keeping the second switch switched-on.

The expression "based on" means, for example, that the protection signal is derived from the detection signal. Derived in turn may mean, for example, that the detection signal is conditioned or that it is processed, e.g., by the control circuit, as described in embodiments further below. In any case, there is a causality between the detection signal and the protection signal, and the protection signal is an immediate response to the detection signal.

The second gate drive circuit may therefore have an input for either only the control signal from the control circuit or a first input for the control signal and a second input for the detection signal. In the first case, the protection signal generated by, e.g., the control circuit, and the control signal are input on the same line. In the second case, the detection signal is input on a separate line to the second gate drive circuit.

According to an embodiment, the second gate drive circuit comprises the gate drive protection circuit. In other words, the gate drive protection circuit may part of the second gate drive circuit. In the second case as described above, i.e., when the detection signal is input on a separate line to the second gate drive circuit, the signal may be received by the gate drive protection circuit inside the second gate drive circuit. The gate drive protection circuit might be, for example, from a logical aspect, an OR-connection that may be realized digitally or as an analog circuit. The gate drive signal may be output immediately according to the input conditions, e.g. when the fault detection signal is detected or may be triggered, by the control circuit signal. That is, the detection signal may arm the gate drive protection circuit, which is triggered when the control circuit signals the switching-on, and then permanently outputs the protection signal, so that the second gate drive circuit outputs the gate drive signal for switching the second switch on and keeping the second switch in a conducting state. In this case, the protection signal is an internal signal of the second gate drive circuit.

Alternatively, the gate drive protection circuit may be a separate part, module or device connected to the second gate drive circuit, receiving the detection signal and outputting the protection signal in case depending on the detection signal.

According to an embodiment, the detection circuit is connected to the gate drive protection circuit and configured to provide the detection signal directly to the gate drive protection circuit.

The second gate drive protection circuit is configured to receive the detection signal and to provide the gate drive signal to the second switch such that the second switch is switched on or kept in a switched-on state. As described above, the second gate drive circuit may be configured to provide the switch-on signal either immediately or only after a switch-on signal has been received from the control circuit. In any case, the signal is maintained once the switch is turned on.

According to an embodiment, the detection circuit is an operational amplifier circuitry connected to the first and the second DC sides of the capacitor for detecting a voltage or voltage change over time at the capacitor caused by the short-circuit and connected to the gate drive protection circuit for providing the detection signal as protection signal directly to the gate drive protection circuit or to the control circuit for providing the detection signal to the control circuit.

The operational amplifier circuit may be adjusted, for example, to compare the input voltage at the capacitor to a threshold value. Similarly, the operational amplifier circuit may be configured to compare an integrated value, for example, of a current associated with the voltage at the capacitor or, for example, a differential value of the voltage to a respective threshold value. Any further methods to detect the short circuit with an operational amplifier circuit may be applied.

According to an embodiment, the detection circuit is an operational amplifier circuit connected to the capacitor for detecting a current or current change over time from or to the capacitor caused by the short-circuit and connected to the gate drive protection circuit for providing the detection signal directly to the gate drive protection circuit or to the control circuit for providing the detection signal to the control circuit.

Alternatively or additionally to the detection of a voltage or change of voltage, a current or change in current between the cells may be detected using an operational amplifier. The detection signal may be received by the gate drive protection circuit, which may be inside or outside the second gate drive circuit, or it may be received by the control circuit.

According to an embodiment, the first gate drive circuit comprises the detection circuit for detecting the short circuit, wherein the first gate drive circuit is configured to provide the detection signal.

The detection circuit may be integrated in the gate driver circuit. Either specialized circuitry or commercially available gate driver circuits may be used that already contain such detection circuitry. In both cases, the detection signal may be provided to the control circuit or to the second gate drive circuit. In this case, the detection signal to the gate drive protection circuit would be the protection signal, which the second gate drive circuit would transform into a gate drive signal switching on or keeping switched on the second switch.

According to an embodiment, the detection circuit is a desaturation detection circuit.

In case the detection circuit is a circuit of the first gate drive circuit, such a detection circuit may be a desaturation detection circuit generating a desaturation signal, which is also commonly known as DSAT or DESAT signal.

According to an embodiment, the detection circuit is configured to provide the detection signal to the control circuit, and the control circuit is configured to process the detection signal and to provide a control signal as protection signal to the second gate drive circuit. That is, in embodiments the control circuit is involved in the protection. The control circuit may receive the detection signal, e.g. from an operational amplifier circuit, a desaturation signal, or any other circuit providing any other detection method presented herein or known to a skilled person, and may be programmed to react accordingly. In this case, a gate drive protection circuit is not required. The control circuit adopts its role and is responsible for the logic. That is, the control circuit decides, if and when the protection signal is sent and directs then by means of this protection signal directly to the second gate drive circuit that generates the according gate drive signal, i.e., the switch-on signal for the second switch. In this case, the protection signal from the control circuit may be interpreted as control signal.

According to an embodiment, the detection circuit is one of a phase voltage analyzer configured to detect a short circuit using a DFT, and a flycap current and current direction detection circuit using a Rogowski coil.

According to an embodiment, the number of cells N is higher than the minimum number Nmin of cells necessary to handle the voltage; and the control circuit is configured to adjust pulse width modulation (PWM) carriers from an N+1 cell scheme to an N cell scheme.

The converter may be designed such that at least one more cell is present so that in case one or more cells fail the remaining cells are capable to compensate the failing cell. In this case, the switching by the control circuit has to be adapted accordingly, i.e., it has to be adapted to the number of intact cells.

According to a second aspect, a method for protecting a flying capacitor converter is provided. The flying capacitor converter comprises a control circuit; and a protection circuit for protecting the flying capacitor converter from a short-circuit failure of a switch, wherein the flying capacitor converter comprises at least two cells, wherein each cell comprises a capacitor having a first DC side and a second DC side, a first switch connected to the first DC side and to a capacitor of a following cell or an output circuit, and a second switch connected to the second DC side and to the capacitor of the following cell or the output circuit. The method comprises the following steps: operating the flying capacitor converter; and during a non-fault operation, controlling a current, by the control circuit, by switching the first and the second switches, and switching the second switch on only when the first switch is switched-off; or upon a detection of a fault operation, where the first switch has a short-circuit failure and has a conducting state, keeping, by the protection circuit, the second switch switched on once the second switch is switched on.

Upon a detection of a fault operation may comprise the further step: switching on the second switch. The switching on may be performed by the protection circuit itself or by a control circuit, for example.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS

100 Flying capacitor converter; phase leg of the flying capacitor converter
102 Control circuit
104 First gate drive circuit
106 Detection circuit
108 Second gate drive circuit
109 Gate drive protection circuit
110 First cell; cell1
112 Switch Q1
114 Switch Q10
116 Capacitor Cf1
120 Second cell; cell2
122 Switch Q2
124 Switch Q9
126 Capacitor Cf2
130 Third cell; cell3
132 Switch Q3
134 Switch Q8
136 Capacitor Cf3
140 Fourth cell; cell4
142 Switch Q4
144 Switch Q7
146 Capacitor Cf4
150 Fifth cell; cell5
152 Switch Q5
154 Switch Q6
156 Capacitor Cf4

160 Output circuit
170 Protection circuit
502 Operational amplifier
800 Method
802 . . . 808 Steps of the method
What is claimed is:

1. A flying capacitor converter comprising:
a protection circuit for protecting the flying capacitor converter from a short-circuit failure of a switch, wherein the flying capacitor converter comprises at least two cells, each of the at least two cells comprising:
a capacitor having a first DC side and a second DC side,
a first switch connected to the first DC side and to a capacitor of a following cell or to an output circuit; and
a second switch connected to the second DC side and to the capacitor of the following cell or to the output circuit;
wherein, during a nominal non-fault operation of the flying capacitor converter, only one of the first switch and the second switch is in a conducting state; and
wherein, during a fault operation where the first switch has a short-circuit failure, the protection circuit is configured to keep the second switch switched-on once the second switch is switched on.

2. The flying capacitor converter according to claim 1, wherein the flying capacitor converter further comprises a control circuit; wherein, during the non-fault operation, the control circuit is configured to control a current by switching the first and the second switches; wherein the control circuit is further configured to switch the second switch on only when the first switch is switched-off, and wherein during the fault operation, where the first switch has a short-circuit failure and has a conducting state after a switching-off operation by the control circuit, the control circuit is configured to switch on the second switch.

3. The flying capacitor converter according to claim 1, wherein the protection circuit comprises a detection circuit for detecting the short circuit, wherein the detection circuit is configured to detect the short-circuit by detecting a voltage or a current at the capacitor and/or first switch and to generate a detection signal to be used for keeping the second switch switched-on.

4. The flying capacitor converter according to claim 3, wherein the protection circuit further comprises a gate drive protection circuit configured to receive the detection signal and to provide the protection signal.

5. The flying capacitor converter according to claim 3, wherein the flying capacitor converter further comprises:
a first gate drive circuit connected to the control circuit for receiving a first control signal and for providing a drive signal to the first switch in accordance with the first control signal; and
a second gate drive circuit connected to the control circuit for receiving a second control signal and for providing a drive signal to the second switch in accordance with the second control signal;
wherein the second gate drive circuit is configured to receive the detection signal, or a protection signal based on the detection signal, and to provide a gate driving signal for keeping the second switch switched-on.

6. The flying capacitor converter according to claim 5, wherein the second gate drive circuit comprises the gate drive protection circuit.

7. The flying capacitor converter according to claim 4, wherein the detection circuit is connected to the gate drive protection circuit and configured to provide the detection signal as protection signal directly to the gate drive protection circuit.

8. The flying capacitor converter according to claim 4, wherein the detection circuit is an operational amplifier circuitry; wherein the operational amplifier circuitry is connected to the first and the second DC sides of the capacitor for detecting a voltage or voltage change over time at the capacitor caused by the short-circuit; and wherein the operational amplifier circuitry is connected to the gate drive protection circuit for providing the detection signal as protection signal directly to the gate drive protection circuit or to the control circuit for providing the detection signal to the control circuit.

9. The flying capacitor converter according to claim 4, wherein the detection circuit is an operational amplifier circuitry that is connected to the capacitor for detecting a current or current change over time from or to the capacitor caused by the short-circuit, and connected to the gate drive protection circuit for providing the detection signal as protection signal directly to the gate drive protection circuit or to the control circuit for providing the detection signal to the control circuit.

10. The flying capacitor converter according to claim 5, wherein the first gate drive circuit comprises the detection circuit for detecting the short circuit, and wherein the first gate drive circuit is configured to provide the detection signal.

11. The flying capacitor converter according to claim 3, wherein the detection circuit is a desaturation detection circuit.

12. The flying capacitor converter according to claim 5, wherein the detection circuit is configured to provide the detection signal to the control circuit, and the control circuit is configured to process the detection signal and to provide a control signal as protection signal to the second gate drive circuit.

13. The flying capacitor converter according to claim 3, wherein the detection circuit is one of a phase voltage analyzer configured to detect a short circuit using a DFT or a flycap current and current direction detection circuit using a Rogowski coil.

14. The flying capacitor converter according to claim 1, wherein the number of cells N is higher than the minimum number Nmin of cells necessary to handle the voltage; and wherein the control circuit is configured to adjust pulse width modulated (PWM) carriers from an N+1 cell scheme to an N cell scheme.

15. A method for protecting a flying capacitor converter, wherein the flying capacitor converter comprises a control circuit and a protection circuit for protecting the flying capacitor converter from a short-circuit failure of a switch, wherein the flying capacitor converter comprises at least two cells, wherein each cell comprises a capacitor having a first DC side and a second DC side, a first switch connected to the first DC side and to a capacitor of a following cell or an output circuit; and a second switch connected to the second DC side and to the capacitor of the following cell or the output circuit, the method comprising:
operating the flying capacitor converter; and
during a non-fault operation, controlling a current, by the control circuit, by switching the first and the second switches, and switching the second switch on only when the first switch is switched-off; or
upon a detection of a fault operation, where the first switch has a short circuit failure and has a conducting state, keeping, by the protection circuit, the second switch switched-on once it is switched on.

\* \* \* \* \*